Oct. 13, 1936.          H. A. EGGERSS          2,057,061
DEVICE FOR APPLYING ADHESIVE TAPE TO CONTAINERS
Filed Dec. 12, 1935          4 Sheets-Sheet 2

INVENTOR.
Hans A. Eggerss.
BY
ATTORNEYS.

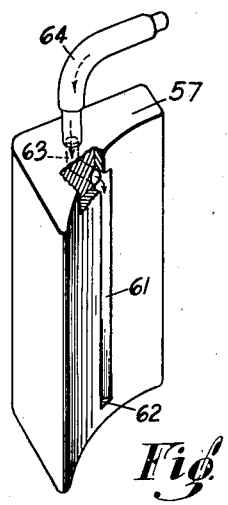
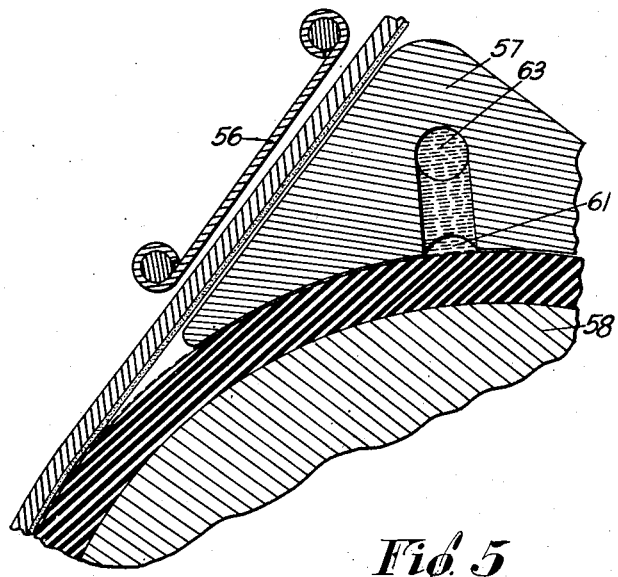
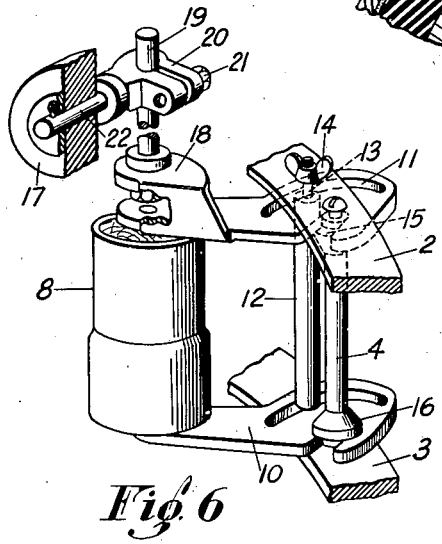
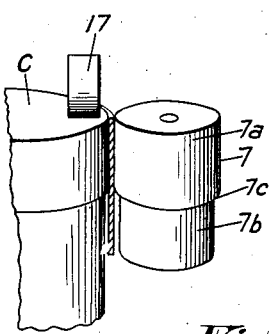
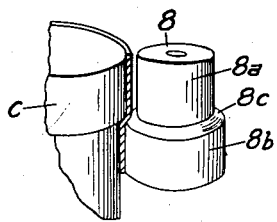
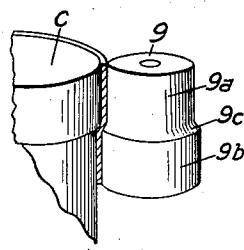

Oct. 13, 1936.    H. A. EGGERSS    2,057,061
DEVICE FOR APPLYING ADHESIVE TAPE TO CONTAINERS
Filed Dec. 12, 1935    4 Sheets-Sheet 4

INVENTOR.
Hans A. Eggerss.
BY
ATTORNEYS.

Patented Oct. 13, 1936

2,057,061

UNITED STATES PATENT OFFICE 2,057,061

DEVICE FOR APPLYING ADHESIVE TAPE TO CONTAINERS

Hans A. Eggerss, Van Wert, Ohio

Application December 12, 1935, Serial No. 54,125

17 Claims. (Cl. 216—29)

My invention relates to a device for applying adhesive tape to containers. It has to do, more particularly, with a device for applying adhesive or gummed tape to cylindrical containers of fiber board or like material and of that type consisting of a cylindrical body portion and a cylindrical closure member which slips down over the upper end of the body portion, in order to maintain the closure member in position on the body portion and to seal the container.

In sealing containers of the type indicated, comprising a body portion and a closure member that slips down over the body portion, it is common to use gummed or adhesive tape. This tape is moistened and is wound around the container in overlapping relation to the joint between the closure member of the container and the body portion thereof. In the past, it has been necessary to do this by hand. This has been difficult because it is hard to handle the sticky tape. Also, it is hard to apply the tape to the container by hand in such a manner that all portions thereof are pressed against the surface to which it is applied so that it will stick uniformly and firmly to said surface. It is especially difficult to apply the tape to the container when the closure member is larger in diameter than the body portion and there is a substantial shoulder formed at the joint between the closure member and the body portion. Furthermore, applying the tape to containers by the hand method is very slow and is, therefore, unsatisfactory. Also, this method is unsatisfactory for various other reasons.

One of the objects of my invention is to provide a device for applying gummed or adhesive tape to containers of the type indicated which is of such a nature that the tape may be applied much more efficiently and much more satisfactorily than by the hand method, heretofore employed for this purpose.

Another object of my invention is to provide a simple and inexpensive device for applying gummed or adhesive tape to containers of the type indicated which is of such a nature that the tape may be applied to the container very rapidly and in such a manner that all portions thereof are properly moistened and pressed against the surface to which it is applied so that it will stick to said surface uniformly and firmly.

Another object of my invention is to provide a device which is particularly applicable to applying gummed tape to containers of the type indicated wherein the closure member is slightly larger in diameter than the body portion and there is a substantial shoulder formed at the joint between the closure member and the body portion.

A further object of my invention is to provide a device of the type indicated for applying gummed tape to cylindrical containers which is of such a nature that it may be quickly and easily adjusted so that it may be employed on containers of various diameters.

A still further object of my invention is to provide a device of the type indicated for applying gummed tape to cylindrical containers which is provided with positive means for feeding the tape and moistening mechanism for moistening the tape which is of such a type that it ensures moistening of the extreme end of the tap fed from the device, even though the device has not been used for some time.

Another object of my invention is to provide a device of the type indicated which is provided with means for positively feeding the tape and for pressing it against the side of the container which is of such a nature that it is not necessary to press the tape with the fingers against the side of the container, even during the initial application of the extreme end of the tape to the container.

In its preferred form, my invention contemplates the provision of a tape-applying device having a main frame of annular form adapted to fit over the container to which the tape is applied. A plurality of pressure rollers are carried by this frame and these rollers are adapted to contact with the side of the container at the joint between the closure member and the body portion thereof. The mountings for these rollers may be readily adjusted to change the positions of the rollers so that the device may be used on containers of various diameters. Means is provided on the frame for holding a roll of tape, for positively feeding the tape from the roll, upon rotation of the device on the container, together with means for simultaneously moistening the tape as it is fed from the roll. I also provide shears for cutting the tape at the proper time. The shears and the moistening mechanism are so arranged relative to each other and cooperate with each other in such a manner that the portion of the tape which has been moistened is entirely removed each time the shears are operated. Furthermore, each time the tape is fed from the device, even the extreme end thereof is moistened so that it will stick to the container readily. One of the pressure rollers is arranged directly adjacent the feeding and moistening mechanism, and this roller will contact with the tape immediately after it passes from the moistening device and will press it against the container. Thus, it is not necessary to press the tape with the fingers against the side of the container, even during the initial application of the extreme end of the tape to the container.

It is merely necessary to rotate the device on the container and the pressure rollers will contact with the tape and press it firmly against the side of the container in overlapping relation to the joint between the closure member and the body portion. The rollers which press the tape against the container are so formed and so located relative to each other that the top portion of the tape is first pressed against the closure member and then, subsequently the bottom portion of the tape is pressed against the body portion of the container. This prevents the tape from following a helical path around the container when the closure member is larger in diameter than the body portion of the container. When the tape has been wound once or a number of times around the container, the shears may be operated in order to sever the tape from the roll.

The preferred embodiment of my invention is illustrated in the accompanying drawings wherein similar characters of reference designate corresponding parts and wherein:

Figure 4 is a perspective view, partly broken away, of a device for supplying moisture to the tape-moistening roll.

Figure 5 is a detail in section showing the device for supplying moisture to the tape-moistening roll.

Figure 6 is a detail in perspective, partly broken away, of the adjustable mounting for the pressure rollers.

Figure 7 is a diagrammatic view illustrating how the first pressure roller that contacts with the tape is formed.

Figure 8 is a view similar to Figure 7 showing the second pressure roller that contacts with the tape.

Figure 9 is a view similar to Figures 7 and 8, illustrating the third pressure roller that contacts with the tape.

Figure 11:
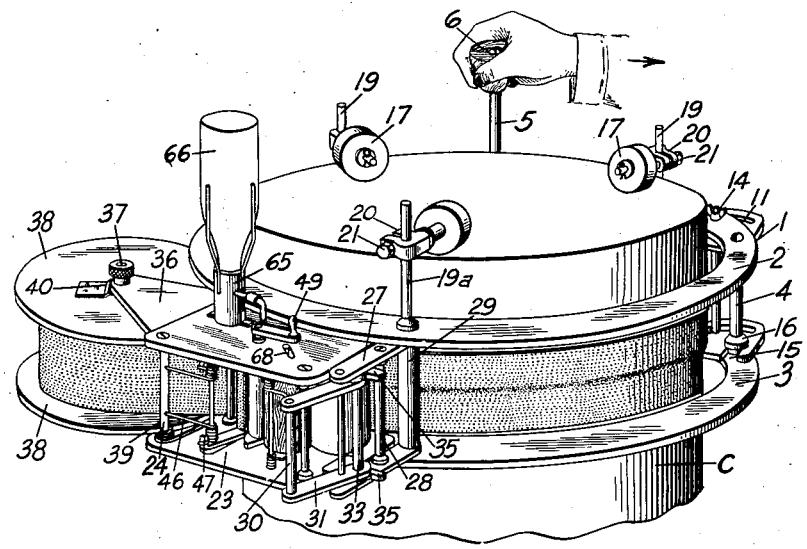
Figure 11 is a view in perspective, showing the device in position on a container and being used to apply tape thereto.

With reference to the drawings, I have illustrated my device as comprising a main frame I of annular form. This main frame I, as illustrated in Figure 11, comprises an upper ring 2 and a lower ring 3 which are held in vertically spaced relation by means of a plurality of spacer members 4. The frame carries an upwardly extending pin 5 having a handle member 6 on its upper end for facilitating rotation of the device on a container. Three pressure rollers, 7, 8 and 9, are provided on the device for pressing the tape firmly against the sides of the container.

Figure 1:
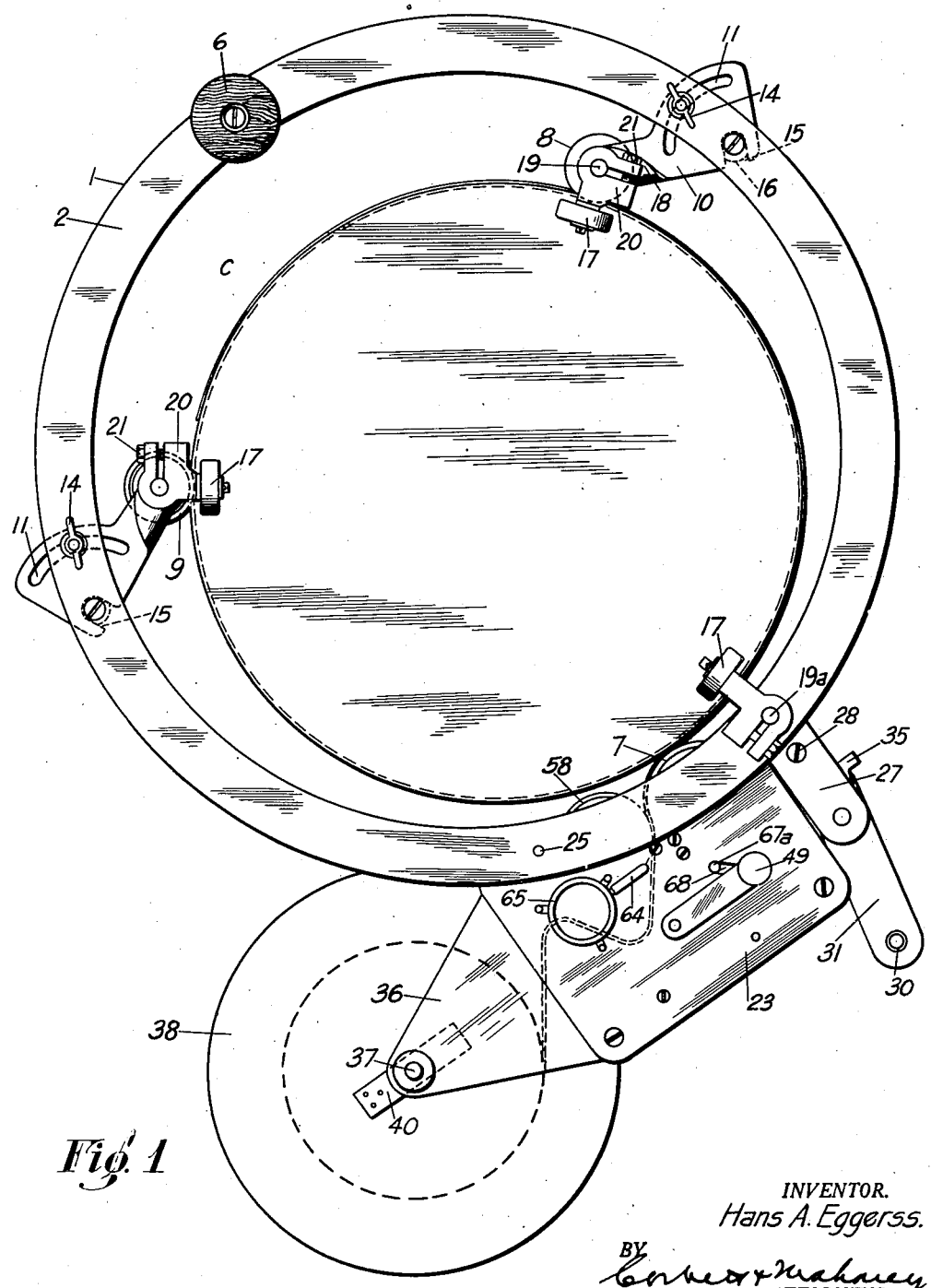
Figure 1 is a plan view of a tape-applying device made in accordance with the principles of my invention.

The means for mounting the pressure rollers 8 and 9 upon the frame is illustrated best in Figures 1 and 6. As shown, each roller is mounted for rotation on the inner ends of a pair of vertically spaced arm members 10. Each of these arm members is enlarged at its outer end and has an arcuate slot 11 formed therein. A spacer member 12 serves to keep the outer ends of the arms 10 spaced apart and closely adjacent the rings 2 and 3 of the frame. At each end the spacer member 12 has a reduced extension 13 which extends through the slot 11 and through an opening in one of the rings of the frame. This extension is threaded and has a threaded wing-nut 14 thereon. Each arm is notched as at 15 to fit around the spacer 4 which is disposed adjacent the spacer 12. A shoulder member 16 is provided adjacent each end of the spacer 4 to aid in keeping the arms in spaced relation. It will be apparent that, if the wing-nuts 14 are loosened, the arms 10 may be rocked around the spacer member 14 as a pivot, this being permitted because of the arcuate slots 11. The wing-nuts 14 may be tightened to hold the arms 10 in any adjusted position. Rocking of the arms 10 causes the roller carried thereby to move toward the center of the arcuate frame or toward the circumference thereof. The roller may be moved outwardly until it lies between the rings 2 and 3 of the frame or it may be swung inwardly toward the center of the frame until the portions 13 of member 12 contact with the outer ends of slots 11.

In order to prevent the annular frame from moving down too far on the container and to position properly the various pressure rollers in overlapping relation to the joint between the closure member and the body portion of the container, I provide three rollers 17 which are adapted to contact with the top of the container, as indicated in Figures 1 and 11. One of these rollers is carried by the mounting for each of the pressure rollers 8 and 9, as illustrated in Figure 6. The upper arm 10 which carries the pressure roller is provided with an extension 18 which extends upwardly and then horizontally so as not to interfere with movement of the pressure roller between rings 2 and 3 of the frame 1. This extension 18 carries a vertically extending pin 19 which has a split collar member 20 mounted thereon and held in any desired vertical position by a screw-bolt 21. This collar 20 carries a horizontally extending roller shaft 22 upon which the roller 17 is mounted. The other roller 17 is carried adjacent the pressure roller 7 on an upwardly extending pin 19a which is rigidly mounted on the frame 1, being mounted in aligning openings formed in the rings 2 and 3. This roller 17 is adjustably mounted on the pin 19a by a split collar 20 in exactly the same way that the other rollers 17 are mounted.

This device may be used on various containers which have the joints between the closure member and the body portion located at different distances from the top of the containers. To take care of any variations in this distance, the rollers 17 may be vertically adjusted so as to always position the pressure rollers in overlapping relation to the joint between the closure member and the body portion.

The adjustable mountings for the pressure rollers 8 and 9 are provided so that the device may be used on containers of various diameters.

To adapt the device for use on containers of various diameters, it is merely necessary to swing the rollers 8 and 9 in or out relative to the center of the annular frame 1. However, it is also desirable to have the pressure roller 7 quickly adjustable in and out relative to the center of the frame in order to facilitate the application of the device to a container and removal thereof from a container. Therefore, the roller 7 is rotatably mounted between two vertically spaced plates 23 which are held in spaced relation by a number of spacer members 24. The unit including these plates 23 is pivoted to the rings 2 and 3 of the frame 1 by means of a vertically extending pivot-pin 25. The pivot pin 25 is located adjacent one of the ends of the plates 23 while the roller 7 is located adjacent the other end of the plates 23. Consequently, when the unit including plates 23 is swung around the pivot-pin 25, the roller 7 will be moved inwardly and outwardly relative to the center of the frame 1. The plates 23 are properly spaced apart so that they will move in between the rings 2 and 3 of the frame 1.

Figure 3:
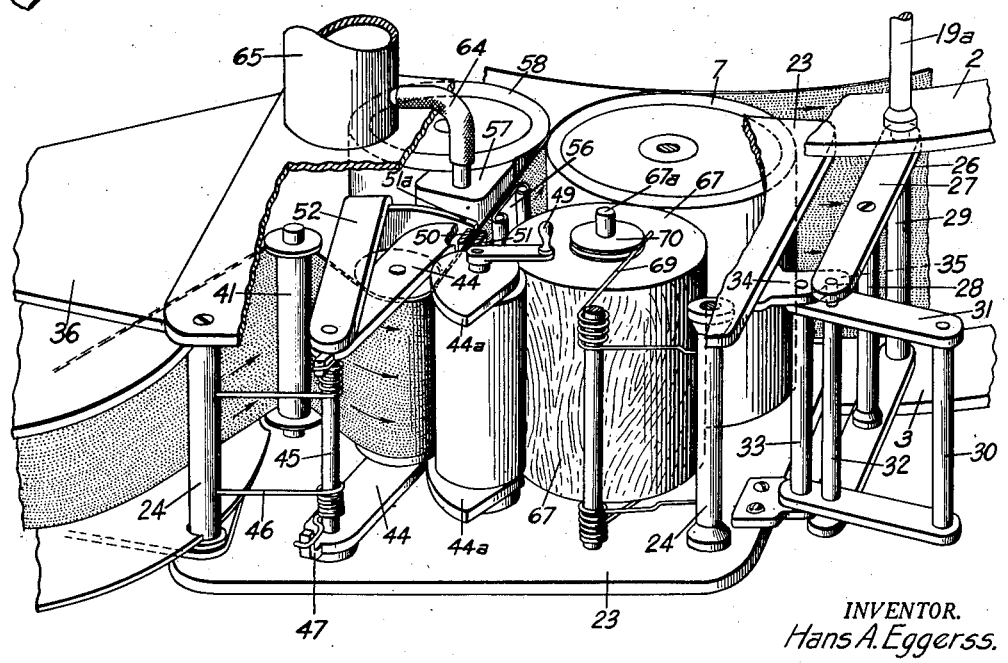
Figure 3 is a perspective view, partly broken away, of the mechanism illustrated in Figure 2.
Figure 10:
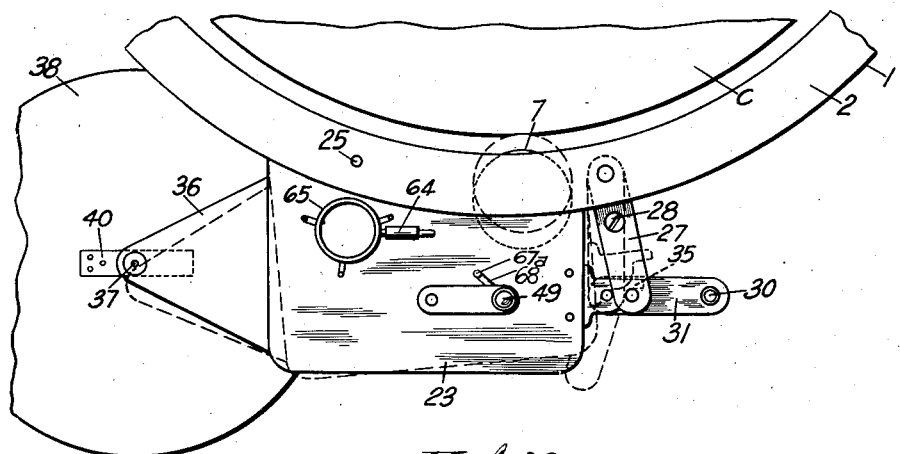
Figure 10 is a view, more or less diagrammatic, illustrating how the support for the tape-feeding, moistening and cutting mechanism, together with one of the pressure rollers, may be swung in and out relative to the center of the device to facilitate application of the device to a container or removal therefrom.

I provide means for facilitating swinging of the unit that carries the roller 7 inwardly and outwardly This means is illustrated best in Figures 1, 3 and 11. As shown, I provide a member 26 which comprises a pair of vertically spaced arms 27 held in spaced relation by a spacer member 28. These arms 27 carry a sleeve 29 on their inner ends which rotates on the lower portion of pin 19a. The outer ends of the arms 27 are pivoted to a handle unit 30. This unit embodies a pair of arms 31 which are vertically spaced. Intermediate the length of these arms 31 but close to the inner end thereof, the outer ends of the arms 27 are pivoted thereto by means of a pivot-pin 32. The extreme inner ends of the arms 31 are pivoted by means of a pivot-pin 33 to a pair of lugs 34 that are rigidly secured to the plates 23 at a point diagonally opposite pivot-pin 25. It will be apparent that if the handle unit 30 is swung outwardly until it is substantially in alignment with the member 26, as indicated by the dotted lines on Figure 10, the unit which carries roller 7 will be swung inwardly. Inward movement of this unit will be limited by the arms 27 striking the edges of plates 23. If the handle member is swung back into the position indicated in Figure 3 and by the full lines of Figure 10, the unit will be swung outwardly. The lugs 34 are provided with stops 35 that contact with the pivot-pin 32 to limit outward swinging of the unit. Thus, the roller 7 may be moved inwardly or outwardly relative to the center of the frame by swinging this unit in or out.

In using this device on a container, the rollers 8 and 9 are adjusted to such positions relative to the center of the frame 1 that, if the device is placed over the particular container and the roller 7 is swung inwardly as far as possible, all three rollers, 7, 8 and 9, will firmly contact with the sides of the container and will, therefore, press the tape firmly thereagainst. Thus, the rollers 8 and 9 are initially adjusted to proper positions depending upon the diameter of the container to which the tape is to be applied. However, the roller 7 may be quickly adjusted in or out to facilitate placing of the device on the container or removal of it from the container.

The unit including the plates 23 which carry the pressure roller 7 also carries the tape-holding device, the tape-feeding mechanism, the tape-moistening mechanism, and the tape-cutting mechanism. For supporting a roll of tape on the unit, a pair of V-shaped plates 36 are attached to one of the ends of the plates 23. These plates carry a removable shaft 37 which is adapted to support a roll of tape. The shaft 37 carries a pair of disks 38. Each of the disks 38 is provided with a notch 39 in its edge which cooperates with one of the spacer members 24 to prevent rotation of the disk. The upper disk 38 is vertically movable on the shaft 37. A flat spring 40 has one end secured to the lower surface of the upper plate 36 and its other end secured to the upper surface of the upper disk 38. This spring normally tends to move the upper disk 38 downwardly so the roll of tape will be frictionally engaged and too rapid unwinding thereof will be precluded.

Figure 2:
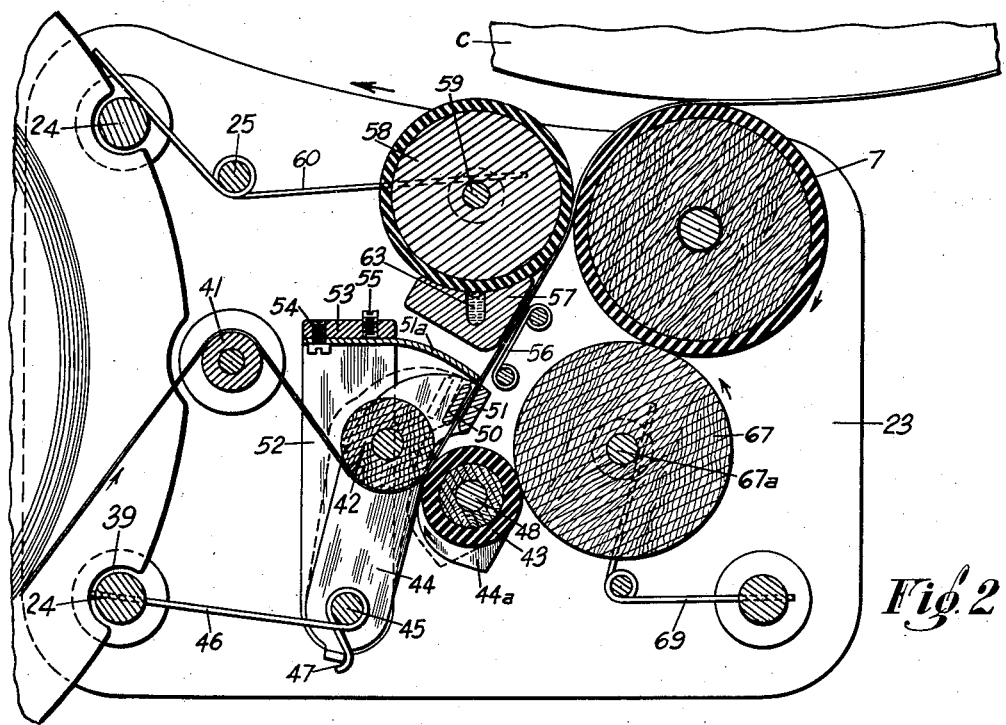
Figure 2 is a horizontal section showing the tape-feeding mechanism, the shears, and the tape-moistening mechanism.

The tape passes from a roll around a guide-roller 41, as indicated in Figures 2 and 3, which is rotatably supported between plates 23. Then, the tape passes between a guide-roller 42 and a driving roller 43. The roller 42 is mounted on the inner ends of a pair of rocker arms 44 which are pivoted for rocking movement at their outer ends on a pin 45. A pair of springs 46 are coiled around the pin 45 and have their free ends engaging projections on the outer ends of arms 44, as at 47. These springs 46 normally keep the roller 42 in firm contact with the driving roller 43. However, the shaft 48 upon which the roller 43 rotates is provided with a pair of cams 44a keyed to the ends thereof and adapted to contact with the edges of the arms 44. This shaft also has a handle member 49 keyed to its upper end. The cams are so shaped that, upon rotation of the handle member in the direction indicated by the arrows in Figure 3, they will contact with the edges of the arms 44 and cause the arms to rock about the pivot-pin 45 in such a manner that the roller 42 will move away from the roller 43, as indicated by the dotted lines in Figure 2. The inner ends of the rocker arms 44 have a vertically disposed guide-plate 50 and a vertically disposed shear-blade 51 mounted thereon and spaced apart to permit passage of the tape therebetween. A pair of arms 52 are rigidly secured to the plates 23 between the rocker arms 44 and said plates. These arms 52 carry a vertically extending support 53 at their inner ends adjacent one edge of which a shear-blade 51a is fastened by means of screws 54. The opposite edge of the support 53 has set-screws 55 threaded therein to facilitate positioning of the outer edge of the shear-blade 51a relative to the blade 51. When the cams 44a are operated to rock the arms 44, it also causes movement of the shear-blade 51 relative to the shear-blade 51a, as indicated by the dotted lines in Figure 2, to cause the tape to be severed at this point. Because of the springs 46, the shear-blades and the roller 42 will normally be in the positions indicated by full lines in Figure 2.

After the tape passes the shears, it passes between a guide 56 and a member 57. It then passes between the pressure roller 7 and a tape-moistening roller 58. The rollers 58, 7 and 43 are preferably covered with rubber. The roller 58 is mounted on a shaft 59, the ends of which are mounted in openings in the plates 23 which are preferably slightly larger than the shaft to permit a certain amount of "play". The member 57 is disposed adjacent the roller 58 and is provided with a curved surface that abuts the roller. A pair of springs 60 is provided and these springs have their outer ends contacting with roller shaft 59 and tend to force the roller in close contact with member 57 for a purpose to be explained. These springs also exert a braking action on the roller to prevent too rapid rotation thereof.

The means for supplying moisture to the surface of the tape-moistening roller 58 is illustrated best in Figures 4 and 5. The member 57 adjacent the roller 58 has a small vertically extending groove 61 formed in the curved surface thereof. The bottom of this groove is closed as at 62. A duct 63 is in communication with the upper end of the groove and extends transversely and then upwardly in the upper end of the member 57. A conduit 64 is provided for conducting water from a socket member 65 (Figures 3 and 11) which receives the neck of a bottle 66, as illustrated in Figure 11, which is adapted to contain a supply of water. It will be apparent that the water will be conducted from the bottle, through the conduit 64, duct 63 and fill up the groove 61. It will not run out of the groove very quickly because the roller 58 fits tightly against the curved surface of the member 57. Only a sufficient amount of water to produce a film on the roller 58 will seep from the groove.

It will be noted from Figure 2 that the shears are located behind the tape-moistening device. Consequently, each time the tape is cut, the entire portion thereof that has been moistened will be removed from the roll. Furthermore, this will ensure that each time the tape is fed from the device, even the extreme end thereof will be moistened. Consequently, the end of the tape will always stick to the container.

A driven roller 67 is disposed between the roller 7 and the roller 43. Consequently, when the roller 7 is rotated, the roller 43 will also be driven. The roller 67 is carried by a shaft 67a that has its upper and lower ends mounted in a slot 68 (Figure 11). Springs 69 are provided for normally urging the roller 67 in contact with the rollers 7 and 43. These springs have their free ends contacting with grooved disks 70 (Figure 3) keyed on the ends of shaft 67a.

The pressure rollers 7, 8 and 9, as previously described, are adapted to contact with the tape and press it against the sides of the container in overlapping relation to the joint between the closure member and the body portion. As will be explained more fully later, the roller 7 will first contact with the tape, then the roller 8 will contact therewith and finally the roller 9 will contact therewith. The roller 7 is illustrated in Figure 7 and its upper half 7a is of substantially greater diameter than the lower half 7b, forming a shoulder 7c. The roller 8 is illustrated in Figure 8 and its upper half 8a is of substantially less diameter than the lower half 8b forming a shoulder 8c. The roller 9 is illustrated in Figure 9 and a difference in diameter between the smaller upper half 9a and the lower half 9b is not as great as in the other instances and an inclined shoulder 9c is formed.

To use my device, the mountings for the rollers 8 and 9 are properly adjusted relative to the center of the frame 1, depending upon the size of the container upon which the device is to be used. The handle member 30 is swung to the position illustrated by the dotted lines in Figure 10 so that the roller 7 is swung outwardly. The device may then be placed over the upper end of a container C as illustrated in Figures 1 and 11. The handle member 30 is then swung to the full line position indicated in Figure 10 which cause the pressure roller 7 to move inwardly. All the rollers 7, 8 and 9 will press firmly against the sides of the container. The rollers 17 are previously adjusted to such a vertical position relative to the rollers 7, 8 and 9 that these pressure rollers will be disposed at the proper level so that they overlap the joint between the closure member and the body portion of the container. The rollers 17 will rest on the upper end of the container and, consequently, limit downward movement of the device on the container.

With the device in position on the container, as illustrated in Figures 1 and 11, it is merely necessary to rotate it on the container by means of the handle 6 in order to apply the tape to the container. The device is rotated in the direction indicated by the arrows in Figures 1 and 11. It will be apparent that, before the device is rotated on the container, the end of the tape will be at the point where the shears are located, because it was previously severed at this point, which is before the tape-moistening device. The handle 49 will be in such position that the roller 43 and the roller 42 will be in contact with each other and the shear blades will be in spaced relation, as indicated by the full lines in Figure 2. The driven roller 67 will always be in contact with the roller 43 and the roller 7.

As soon as the device is rotated on the container, the roller 7 is driven by frictional contact with the side of the container. This drives rollers 67 and 43 and will, consequently, cause the end of the tape to feed forwardly until it passes between the tape-moistening roller 58 and the roller 7. As rotation of the device on the container continues, the tape is fed forwardly until it passes between the roller 7 and the side of the container. This presses the end of the tape against the container and causes it to stick thereto. Thus, it is not necessary to press even the extreme end of the tape against the container with the fingers to cause it to stick thereto, since the tape is positively fed forwardly and the pressure roller 7 will contact therewith immediately after it passes the tape-moistening roller and will cause it to stick to the container. As the tape is progressively unwound from the roll, during rotation of the device on the container, the other pressure rollers 8 and 9 will contact therewith and press it firmly against the sides of the container, causing it to adhere firmly thereto.

As soon as one or more layers of the tape have been applied to the container in overlapping relation to the joints, the handle member 49 may be operated to cause the tape to be severed by the shears. This also causes the roller 42 to move away from the roller 43 which will prevent any more tape from being unwound from the roll. However, if the device is further rotated on the container, the end of the tape which has been severed from the roll will be drawn through the roller 7 and the tape-moistening roll 58 and be pressed against the container. Thus, it is not necessary to use the fingers to press the end of the tape, which is first applied to the container, against the container or to press the end of the tape, which is last applied to the container, against the container. As previously stated, since the shears are arranged before the tape-moistening roller, all the moistened portion of the tape will be completely removed each time the shears are operated. The entire device may then be removed from the container by moving the roller 7 outwardly through the medium of handle 30. Then, the device may be slipped readily off the upper end of the container.

The container C, which I have illustrated in the drawings, has a closure member which slips down over the body portion. The closure member is slightly larger in diameter than the body portion of the container. I have found that, if rollers of the same diameter throughout the height thereof, are used to press the tape against the side of the container in order to cause it to adhere thereto, it will tend to follow a helical path around the container and the lower half of the tape will not be pressed firmly against the body portion. Therefore, each of the rollers is preferably formed as illustrated in Figures 7, 8 and 9.

As previously stated, the roller 7 will be the first to contact with the tape upon rotation of the device on the container. The upper half 7a of this roller will press the upper half only of the tape against the side of the closure member and cause it to adhere thereto. The lower half 7b will not function at all. As the device is rotated further relative to the container and the tape is progressively applied thereto, the roller 8 will next contact with the tape. The lower half 8b of this roller will press the lower half only of the tape against the side of the body portion of the container. The upper half 8a will not function at all. The roller 9, as rotation of the device on the container is continued, will next contact with the tape. This roller, however, is so constructed that both its upper and lower halves will contact with the upper and lower halves of the tape and press it against the closure member and body portion, respectively. Thus, the upper half of the tape is first applied to the closure member and subsequently the lower half of the tape is applied to the body portion. This prevents the tape from following a helical path around the container and ensures that both the upper half of the tape will be pressed firmly against the closure member and the lower half of the tape will be pressed firmly against the body portion so that the tape will adhere firmly to both the closure member and the body portion.

If desired, several forms 1 of various diameters may be provided. This would be advantageous if the machine were to be used on various containers of widely varying diameters. It would be possible to readily remove the rollers and the tape-moistening, feeding and cutting unit from one frame and apply them readily to another frame of different diameter.

It will be apparent from the description above that I have provided a device for applying gummed or adhesive tape to containers of the type indicated which is much more efficient and much more satisfactory than the hand method heretofore employed for this purpose. The device which I use in applying the tape to the container is of such a nature that the tape may be applied to the container very rapidly and in such a manner that all portions thereof are properly moistened and pressed against the surface to which it is applied so that it will stick to said surface uniformly and firmly. The device which I use is of simple structure and is inexpensive to manufacture. Furthermore, it requires little or no skill to use this device.

Having thus described my invention, what I claim is:

1. A device for applying tape to articles of the type indicated comprising a unit adapted to be positioned in cooperative relation to the article, said unit carrying a plurality of pressure rollers adapted to be moved relative to the article to progressively apply the tape thereto, means for adjusting said rollers relative to each other so that they will contact with the sides of the article, and other means for adjusting one of said rollers relative to the others.

2. A device for applying tape to articles of the type indicated comprising a frame adapted to be positioned in surrounding relation to the article and to be rotated relative thereto, said frame carrying a plurality of pressure rollers adapted to be moved around the article to progressively apply the tape thereto when said frame and the article are rotated relative to each other, and means for adjusting one of said rollers in and out relative to the center of the frame.

3. A device for applying tape to cylindrical containers comprising a frame adapted to be placed over the container in surrounding relation thereto and to be rotated relative, a plurality of pressure rollers carried by the frame and adapted to contact with the sides of the container and to progressively apply the tape thereto when said frame and the container are rotated relative to each other, and means for adjusting said rollers in and out relative to the center of the frame so that the device may be used on containers of various sizes.

4. A device for applying tape to cylindrical containers comprising a frame adapted to be placed over the container in surrounding relation thereto and to be rotated relative thereto, a plurality of pressure rollers carried by the frame and adapted to contact with the sides of the container and to progressively apply the tape thereto when the container and the frame are rotated relative to each other, and means for adjusting one of said rollers in and out relative to the center of the frame to facilitate application of the device to the container and removal of it therefrom.

5. A device for applying tape to cylindrical containers comprising a frame of annular form adapted to be placed over the container, a plurality of pressure rollers carried by the frame and adapted to contact with the sides of the container and to progressively apply the tape thereto, means for adjusting said rollers in and out relative to the center of the frame, and other means for adjusting one of said rollers in and out relative to the center of the frame.

6. A device for applying gummed tape to cylindrical containers comprising a frame adapted to be positioned in surrounding relation to the container and to be rotated relative thereto, means carried by the frame for progressively applying the tape to the container when the frame and the container are rotated relative to each other, a device carried by the frame for moistening the tape, a device carried by the frame for cutting the tape, said cutting device being arranged behind said moistening device so that the tape will be cut at a point behind said moistening device.

7. A device for applying gummed tape to cylindrical containers comprising a frame adapted to be positioned in surrounding relation to the container and to be rotated relative thereto, means carried by the frame for progressively applying the tape to the container when the frame and container are rotated relative to each other, a tape-moistening roller carried by the frame, shears carried by the frame, said shears being arranged behind said tape-moistening roller.

8. A device for applying tape to containers comprising a frame adapted to be positioned in surrounding relation to the container and to be rotated relative thereto, pressure means carried by the frame and adapted to be moved relative to the container to progressively apply the tape thereto when the frame and the container are rotated relative to each other, and means for positively feeding the tape as the pressure means is moved relative to the container.

9. A device for applying gummed tape to containers comprising a frame adapted to be positioned in surrounding relation to the container and to be rotated relative thereto, pressure means carried by the frame and adapted to be moved relative to the container to progressively apply tape thereto when the frame and the container are rotated relative to each other, means for positively feeding the tape as the pressure means is moved relative to the container, means for moistening the tape before it is applied to the container, and means for cutting the tape, said cutting means being arranged behind the moistening means.

10. A device for applying gummed tape to cylindrical containers comprising an annular frame adapted to be positioned over the container, a plurality of pressure rollers carried by the frame and adapted to be revolved relative to the container to progressively apply the tape thereto, and means operated by revolving the rollers relative to the container for positively feeding the tape.

11. A device for applying gummed tape to cylindrical containers comprising an annular frame adapted to be positioned over the container, means carried by the frame for holding the tape, a plurality of pressure rollers carried by the frame and adapted to contact with the side of the container, means for positively feeding the tape, said means being operable by rotation of one of said pressure rollers.

12. A device for applying gummed tape to cylindrical containers comprising an annular frame adapted to be positioned over the container, means carried by the frame for holding the tape, a plurality of pressure rollers carried by the frame and adapted to contact with the side of the container, means for positively feeding the tape, said means being operable by rotation of one of said pressure rollers, and means for rendering said feeding means inoperative.

13. A device for applying gummed tape to cylindrical containers comprising an annular frame adapted to be positioned over the container, means carried by the frame for holding the tape, a plurality of pressure rollers carried by the frame and adapted to contact with the side of the container, means for positively feeding the tape, said means being operable by rotation of one of said pressure rollers, means for moistening the tape, shears for cutting the tape, and means for simultaneously operating the shears and rendering said feeding means inoperative.

14. A device for applying gummed tape to cylindrical containers comprising an annular frame adapted to be positioned over the container, means carried by the frame for holding the tape, a plurality of pressure rollers carried by the frame and adapted to contact with the side of the container, a tape-moistening roller positioned in contact with one of said pressure rollers, shears arranged behind said tape-moistening roller for cutting the tape, tape-feeding rollers arranged behind said shears for positively feeding the tape, and means for operating said shears to cut the tape and to simultaneously render said tape-feeding rollers inoperative.

15. A device for applying gummed tape to cylindrical containers comprising an annular frame adapted to be positioned over the container in surrounding relation thereto, a plurality of brackets carried by said frame at circumferentially-spaced intervals, some of said brackets being so mounted on the frame that they are adjustable towards and from the center of the frame, each of said brackets carrying a pressure roller adapted to contact with the side of the container and a second roller adapted to contact with the top of the container, said second roller being vertically adjustable on the bracket to properly position the pressure roller at the side of the container, a unit pivoted to said frame, said unit comprising means for holding the tape, means for positively feeding the tape, means for moistening the tape and means for cutting the tape, said unit also carrying a pressure roller, and means for swinging said unit about its pivot towards and from the center of the frame to move the last-named pressure roller into and out of contact with the side of the container.

16. A device for applying gummed tape to cylindrical containers comprising an annular frame adapted to be positioned over the container in surrounding relation thereto, a plurality of brackets carried by said frame at spaced intervals, some of said brackets being so mounted on the frame that they are adjustable towards and from the center of the frame, each of said brackets carrying a pressure roller adapted to contact with the side of the container and a second roller adapted to contact with the top of the container, said second roller being vertically adjustable on the bracket to properly position the pressure roller at the side of the container.

17. A device for applying gummed tape to cylindrical containers comprising a frame adapted to be positioned in cooperative relation to the container, a plurality of pressure rollers carried at spaced intervals on the frame and adapted to be revolved relative to the container to progressively apply the tape thereto, means operated by revolving the rollers for positively feeding the tape, means for moistening the tape before it is applied to the container, and means for cutting the tape, said cutting and moistening means being arranged so that the tape reaches the cutting means before it reaches the moistening means.

HANS A. EGGERSS.